(No Model.)

J. W. McDERMOT.
THILL COUPLING.

No. 433,417. Patented July 29, 1890.

Witnesses
F. C. Gibson
C. D. Davis

Inventor
James W. McDermot
By his Attorney
C. M. Alexander

UNITED STATES PATENT OFFICE.

JAMES W. McDERMOT, OF NEVADA, ASSIGNOR OF ONE-HALF TO ALLEN SMALLEY AND M. A. SMALLEY, BOTH OF UPPER SANDUSKY, OHIO.

THILL-COUPLING.

SPECIFICATION forming part of Letters Patent No. 433,417, dated July 29, 1890.

Application filed May 6, 1890. Serial No. 350,756. (No model.)

*To all whom it may concern:*

Be it known that I, JAMES W. MCDERMOT, a citizen of the United States, residing at Nevada, in the county of Wyandot and State of Ohio, have invented certain new and useful Improvements in Pole and Thill Couplings, of which the following is a specification, reference being had therein to the accompanying drawings, in which—

Figure 1:
Figure 2:
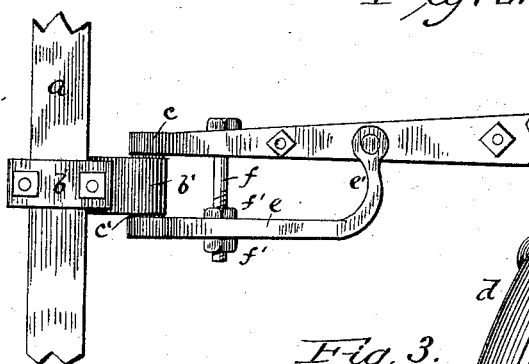
Figure 3:
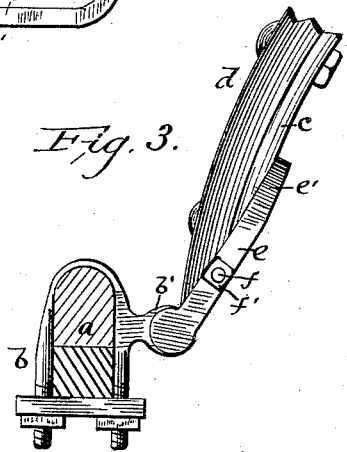

Figure 1 represents a plan view of my improvement; Fig. 2, a bottom view thereof, and Fig. 3 a side elevation.

The object and the nature of the invention will be further pointed out in the course of this specification.

In the drawings annexed, the letter $a$ designates the axle of an ordinary vehicle; $b$, a clip secured thereon in the usual way, and $b'$ a cylindrical enlargement formed on the front face of the clip and provided in its ends with conical depressions. The vehicle-shaft $d$ has bolted to its rear end the shaft-iron $c$, which has formed integral with it, at its forward end, a laterally-projecting conical enlargement $c'$, which fits snugly within the conical depression in the adjacent end of the enlargement $b'$.

The letter $e$ designates an arm running parallel with the shaft-iron and to one side thereof, this arm being pivotally secured to the shaft-iron at its forward end by a lateral extension $e'$, and provided at its rear end with a lateral conical enlargement $c'$, similar to the one on the shaft-iron and working in the opposite end of the part $b'$. Connecting the shaft-iron to the arm $e$ is a horizontal bolt $f$, which is provided with clamping-nuts $f'$ $f'$ upon opposite sides of the said arm and adapted to clamp the same and hold the parts rigidly in their adjusted positions.

This device forms a perfect anti-rattling thill and pole coupling. It can be readily adjusted to compensate for wear of the contacting parts, and when so adjusted will be prevented from jarring loose. By making the arm $e$ parallel with the shaft-iron binding is prevented and the clamping-nuts are enabled to grasp it squarely.

Having thus fully described my invention, what I claim is—

The combination of an axle provided with a clip, this clip having formed on it an enlargement $b'$, provided in its ends with conical depressions, a shaft-iron $c$, provided on one side with a conical enlargement adapted to enter one of the depressions in the end of the part $b'$, an arm $e$, running approximately parallel with the shaft-iron and pivotally connected at its forward end thereto, the rear end of this arm being provided with a conical enlargement setting in the other conical depression in the part $b'$, a bolt $f$, connecting the arm and shaft-iron, and nuts $f'$ $f'$ upon the said bolt and adapted to clamp and hold the said arm upon opposite sides and prevent it jarring loose, as and for the purposes described.

In testimony whereof I affix my signature in presence of two witnesses.

JAMES W. McDERMOT.

Witnesses:
 REUBEN MILLER,
 R. L. SOUDER.